United States Patent [19]

Weber et al.

[11] 3,988,260

[45] Oct. 26, 1976

[54] OXIDATIVE REVIVIFICATION OF MOLECULAR SIEVE CATALYSTS ADMIXED WITH REFRACTORY PARTICLES

[75] Inventors: Willis W. Weber, South Salem; Donald F. Best, Mahopac, both of N.Y.

[73] Assignee: Union Carbide Corporation, New York, N.Y.

[22] Filed: May 9, 1975

[21] Appl. No.: 576,142

[52] U.S. Cl. ............................ 252/418; 252/412; 252/416; 208/111; 208/120; 208/149
[51] Int. Cl.² .................................... B01J 29/38
[58] Field of Search ........ 252/416, 418, 419, 411 R; 208/120, 111, 149

[56] References Cited
UNITED STATES PATENTS

| | | |
|---|---|---|
| 2,892,771 | 6/1959 | Milliken, Jr. .................... 252/411 R |
| 3,301,792 | 1/1967 | Lewallen .......................... 252/418 |
| 3,692,692 | 9/1972 | Ward et al. ....................... 252/419 |
| 3,761,400 | 9/1973 | Mitchell .......................... 252/411 R |

*Primary Examiner*—Patrick P. Garvin
*Assistant Examiner*—P. E. Konopka
*Attorney, Agent, or Firm*—Richard G. Miller

[57] ABSTRACT

Molecular sieve catalyst compositions having decreased catalytic activity as a result of accumulating more than 2 weight-% carbonaceous coke deposits are restored essentially to their pre-coked activity by heating an essentially homogeneous mixture of particles thereof with particles of an inert refractory material in the weight ratio of from 1:2 to 1:10 in air at a temperature of from 500° C. to 725° C. for a period of time sufficient to decrease the carbonaceous coke to less than two weight percent.

4 Claims, No Drawings

OXIDATIVE REVIVIFICATION OF MOLECULAR SIEVE CATALYSTS ADMIXED WITH REFRACTORY PARTICLES

This invention relates in general to oxidative regeneration of zeolitic molecular sieve-based catalyst compositions employed in hydrocarbon conversion processes having thereon a hydrocarbonaceous coke deposit whereby the bulk of the coke is reacted to form water and the oxides of carbon. More particularly the invention relates to an improved method for rapidly removing coke deposits from particles of a molecular sieve composition in which the said composition particles are homogeneously admixed with from 2 to 10 times their weight of size-separable particles of a refractory substance and heated in air at a temperature of from 500° C. to 725° C. This method is especially suitable for large-scale continuous thermal treatment of spent catalyst masses, such as for hydrocracking and alkylation, returned in large quantities from commercial petroleum refineries.

The physical and chemical properties of zeolitic molecular sieves and their uses as adsorbents and catalysts are well known and treated in detail in the literature. In many of these processes of use organic compounds are in contact with the molecular sieves, and as a result hydrocarbonaceous material, called coke, which is non-volatile at the process operating conditions, is formed on the surface and within the pores of the molecular sieve. This coke formation causes a reduction in the adsorptive capacity and catalytic activity of the molecular sieve. Consequently the molecular sieve must be periodically reactivated by removal of the coke deposit.

The periodic reactivation of a molecular sieve mass by removal of coke deposits must be carried out in such a manner that high selective adsorptive capacity of the sieve is retained and no substantial damage is done to the crystal structure of the sieve. The adsorptive capacity must be retained not only on the surface of the molecular sieve crystals but especially throughout the entire pore volume of the crystals. Further, the selective adsorption properties of crystalline zeolitic molecular sieves depend on the uniformity of the pores in the crystal lattice. Therefore any substantial damage to the essential crystal structure destroys the selective properties of the sieve.

Crystalline zeolitic molecular sieves may also be loaded, within the pores of the crystal structure, with a variety of metals such as nickel, platinum and palladium. Efficient use of the metal component of the catalyst composition is achieved only when it is finely dispersed. In use at elevated temperatures the metal particles tend to agglomerate and cause a substantial loss of available surface area and activity. A number of methods are available to redistribute the agglomerated metal periodically, as for example in U.S. Pat. No. 3,647,717 issued to A. P. Bolton on Mar. 7, 1972.

Several methods have been proposed for oxidatively regenerating the coked catalyst. Essentially these methods comprise burning the carbonaceous coke from the zeolite using low controlled amounts of oxygen to avoid the development of destructively high temperatures (with respect to the zeolite). Precautions are also taken to avoid the creation of too high a concentration of water which otherwise would tend to effect noble metal agglomeration and deteriorate the crystal structure by hydrolysis. A particularly effective oxidative regeneration procedure for coked molecular sieve bodies is set forth in U.S. Pat. No. 3,069,362 issued Dec. 18, 1962 to R. L. Mays, et al. The process treats the catalyst in situ using a forced supply of gas containing carefully controlled amounts of oxygen and can require as long as 160 hours.

If a procedure such as the Mays, et al. process is carefully executed, it is frequently found that a noble metal-loaded zeolite catalyst coked during service in a hydrocracking process is regenerated essentially completely as evidenced by its hydrocracking activity with respect to a sweet and/or nitrogen-containing petroleum feedstock. This is true despite the fact that agglomerates of the noble metal persist in the regenerated catalyst which are clearly visible using an electron microscope. It is surprisingly found, however, that if the regenerated catalyst composition is evaluated using a sour feedstock, the degree of restoration is apparently much less complete. A possible explanation of this phenomenon is that the presence of agglomerated noble metal on the regenerated catalyst significantly reduces the effective concentration of the hydrogenation component and that under sour conditions this concentration is further reduced by conversion to noble metal sulphide.

It is the objective of the present invention to provide an improved oxidative regeneration process for coked zeolitic molecular sieve compositions which requires a remarkably short period of residence time, typically less than 2 hours, and causes a minimum amount of hydrothermal abuse to the crystal structure. It also can be utilized immediately after a rejuvenation treatment whereby catalytic metal loadings are redispersed without harmful effect on the dispersed metal.

The revivification process of the present invention which achieves the aforesaid objective is based on the surprising discovery that when refractory particles are admixed with coked molecular sieve particles and heated in air, there is a significant relationship between the relative proportions of the two materials and the temperature employed which increases the rate of coke removal while maintaining an operating temperature that is consistent with consequent prevention of crystal lattice deterioration and contributes to essentially complete restoration of catalytic activity.

The process comprises providing a uniform mixture of first particles of zeolitic molecular sieve composition containing greater than 2, preferably greater than 8, weight-% of a hydrocarbonaceous coke formed thereon, with from 2 to 10 times the weight thereof of second particles of an inert refractory material preferably size-separable from said first particles, the particles having a minimum particle size of 200 mesh (U.S. Sieve Series) and having a maximum dimension along any axis of about 13 millimeters, and heating said mixture in air and the reaction products of air and the hydrocarbonaceous coke on said molecular sieve particles at a temperature of from 500° C. to 725° C. for a period of time to reduce the coke deposit to less than 2 weight-%. By the expression size-separable is meant that the particles of refractory material are sufficiently larger or smaller than the particles of molecular sieve-containing particles that conventional separation methods, such as screening, based on differences in particle size can be employed.

The class of zeolitic molecular sieves involved in the present invention is limited only by the requirement that the crystal structure be capable of withstanding original dehydration and subsequent heating to 725° C. The vast majority of the known synthetic and naturally-occurring zeolites are thus included within the suitable class, especially, erionite, faujasite, mordenite, zeolite X, zeolite L, zeolite Y, zeolite "omega" and the so-called family identified as "ZSM-5 type" zeolites well documented in the patent literature.

The coke deposits to be removed from the zeolite-containing catalyst or adsorbent masses comprises mainly carbon and hydrogen, in which the ratio of hydrogen atoms to carbon atoms are frequently as high as 2 to 1. The chief precursors of the coke are polycyclic aromatics and highly unsaturated aliphatic compounds which are either adsorbed by or decomposed on the zeolite. The weight of coke formed on the zeolite base at the time the regeneration procedure is begun is not a critical factor, but typically the adsorbent or catalyst masses to be regenerated carry from 5 to 17 weight per cent coke based on the overall weight of the coked particle.

The conformation of the molecular sieve-containing particles can be regular or irregular, but most commonly will be spherical or cylindirical as a result of being formed by extrusion, tableting, spray-drying or prilling. Regardless of their shape, the maximum dimension along any axis of those particles does not usually exceed about 13 millimeters. Typically, the particles would be cylindrical extruded shapes from about 3 to 13 millimeters in length and 3 to 13 millimeters in diameter, or spherical particles of from about 0.8 to 13 millimeters in diameter. It will be understood that the molecular sieve-containing particles are typically composites which may also contain materials such as alumina, silica-alumina, silica, clays, lubricants, binders and diluents, and possibly also metal hydrogenation components distributed on such materials.

The refractory particles suitably employed are those which are relatively resistant to grinding attrition in admixture with the aforesaid molecular sieve particles and which withstand temperatures of 750° C. without melting or otherwise deteriorating or reacting with air, water, the oxides of carbon or the coke deposit generally. Typical materials of this class are quartz (silica) and its numerous varieties such as flint and agate in the form of sand, pellets, spheres, natural pebbles, gravel and rock crystal, as well as fused quartz in a similar variety of shape: ceramic-ware pebbles and spheres; commercial refractory aluminas (calcined, sintered or fused) and natural corundums in the form of chips, tablets, granules and spheres; refractory oxides such as those of zirconium, magnesium, calcium and chromium; refractory carbides such as silicon carbide, tungsten carbide and boron carbide; also spinel (MgO . $Al_2O_3$) and mullite ($3Al_2O_3$ . $2SiO_2$), again in suitable sizes and shapes.

It is understood, of course, that the particles of refractory material do not contain any appreciable coating of carbonaceous coke or other material which will burn in air at the temperature conditions of the process. In most instances, therefore, the refractory particles are admixed with the molecular sieve particles after the latter have become coked, and after treatment by the present process the two types of particles are separated before the molecular sieve particles are returned to service. For this mode of operation it is highly advantageous to select the particle size of the refractory material with reference to that of the molecular sieve particles so that simple mechanical size-selective separation means can be employed. Following such separation step the refractory particles are recycled to be used with the next charge to be treated. In some instances, however, the refractory material is much less susceptible to coking than molecular sieve particles and the two types can, therefore, remain admixed after the revivification process when the molecular sieve is returned to the coking site.

More specifically, a typical procedure for revivifying a large supply of spent hydrocracking catalyst containing palladium on Type Y is as follows:

The coked catalyst (12% coke, 2% graphite) in the form of ⅛-in. tablets is first rejuvenated by previously established chemical procedures. After the rejuvenated material has been washed, it is sent through a dryer at the rate of 500 lbs. per hour to achieve an LOI of 10 –12 percent. The dried material is then blended with quartz sand (10 –16 mesh) in the ratio of 2 lbs. of sand per lb. of catalyst pellets and 1500 lbs. of the mixture is transferred to an externally heated rotary kiln, which is open to the atmosphere but no forced draft of air or other purge gas is passed through the kiln. The maximum bed temperature is 650° C. At the end of the run (approximately one hour duration) the charge is expelled from the kiln and sent to a screen separator to remove the treated catalyst pellets from admixture with the quartz particles. The latter are recycled to the kiln feed area.

The inter-relation between the process temperature and the relative proportions of inert refractory material and molecular sieve catalyst particles is evident from the data presented in Table A. The data concerning the post-regeneration residual loading of carbon on the catalyst includes at least a portion of the graphite originally present in the catalyst tablets. This graphite is an extrusion aid in the preparation of the tablets.

TABLE A

REGENERATION OF COKED CATALYST CHARGES

| Run No. | Refractory/ Catalyst Mass Wt.-Ratio | Kiln Temp. °C | Residence Time, Min. | Wt.-% C* | S.A., $M^2/g$ |
|---|---|---|---|---|---|
| Catalyst Mass "A" (a)(b): | | | | | |
| 30-4 | 10:1 | 550 | 60 | 1.2 | — |
| 30-5 | 10:1 | 550 | 60 | 2.0 | — |
| Catalyst Mass "A" (b)(c): | | | | | |
| 81-1 | 2:1 | 600 | 110 | 0.9 | 444 |
| 60-6 | 5:1 | 675 | 60 | 0.83 | 458 |
| 62-5 | 5:1 | 700 | 60 | 1.9 | 458 |
| 54 | 10:1 | 550 | 60 | 0.86 | 537 |
| Catalyst Mass "B" (d)(c): | | | | | |
| 65-5 | 2:1 | 700 | 60 | 1.5 | 462 |
| 81-2 | 2:1 | 600 | 110 | 1.7 | 484 |
| 81-3 | 2:1 | 600 | 110 | 1.4 | 470 |
| 72 | 2:1 | 600 | 110 | 1.8 | — |
| 68-6 | 2:1 | 600 | 110 | 1.7 | 513 |
| 68-5 | 3:1 | 650 | 110 | 1.4 | 483 |
| 68-4 | 4:1 | 650 | 110 | 1.4 | 500 |
| 68-3 | 4:1 | 675 | 90 | 1.8 | 498 |
| 68-2 | 4:1 | 650 | 90 | 2.0 | 477 |
| 65-4 | 5:1 | 675 | 60 | 1.5 | 481 |
| 65-3 | 5:1 | 650 | 60 | 1.9 | 470 |
| 65-1 | 5:1 | 600 | 60 | 1.6 | 490 |
| Catalyst Mass "C" (e)(f): | | | | | |
| 40-1 | 2:1 | 500 | 60 | 2.0 | — |

TABLE A-continued

REGENERATION OF COKED CATALYST CHARGES

| Run No. | Refractory/ Catalyst Mass Wt.-Ratio | Kiln Temp. °C | Residence Time, Min. | Wt.-% C* | S.A., M²/g |
|---|---|---|---|---|---|
| 40-3 | 2:1 | 550 | 60 | 0.55 | 640 |

*Anydrous weight
(a) Refractory material: silica powder, size 200 mesh
(b) As recd. carbon content 14 wt-%.
(c) Refractory material: quartz sand, size 12 × 16 mesh
(d) As recd. carbon content 11.8 wt-%.
(e) As recd. carbon content 13.8 wt-%.
(f) Refractory material: quartz chips.

In obtaining the data shown in Table A the molecular sieve particles treated were a catalyst composition used in hydrocracking of a petroleum feedstock and which comprised a low-sodium zeolite Y loaded with palladium as a hydrogenation agent. The particles were essentially cylindrical in shape, having a height of ⅛ inch and a base diameter of ⅛ inch. The particles had become coked in service in a commercial hydrocracking unit and contained 14 weight-% carbon in the form of hydrocarbonaceous coke. The refractory particles were quartz in the form of (essentially spherical) sand particles of average size of 12 × 16 mesh (U.S. Sieve Series). The various mixtures of refractory material and molecular sieve particles specified were heated at the temperatures and for the time periods indicated in a rotary kiln which is open to the atmosphere. In contradistinction to usual regeneration method no forced draft of air or diluted oxygen purge gas was passed through the kiln. The preferred mode of operation permits the handling of large quantities of materials under conditions which are uniform for all particles in the mass being treated, and no supply of compressed gas or flow rate control thereof is necessary.

Within the useful operating temperature range according to the present invention, the weight ratio of refractory material to catalyst mass (R/C) and the residence time are inter-related. In the lower portion of the temperature region, i.e., approximately 500°–600° C. using an R/C value of about 2, the coke deposit can be reduced to below 2 wt.-% by increasing the residence time. By operating at temperatures up to about 725° C. and by using higher R/C values, i.e., up to about 10, residence times as short as about 30 minutes are sufficient to achieve excellent removal of the coke deposit. Thus, those operating the regeneration unit in accordance with the invention are able to select temperature and R/C values to meet a particular time schedule for processing the coked charge; this is especially important if virtually continuous operation is required for handling large quantities of coked catalyst. Additional flexibility is offered by selection of particle size of the refractory material. For timely processing, operating temperatures in the range of about 625° to 725° C. at the higher R/C values (5–10) are preferred. Typically, surface areas of the thus-processed catalyst materials exceed about 460 M²/gram.

In a specific example of the operation of the present process, a hydrocracking catalyst which had previously been in service in a commercial hydrocracking unit for at least four years was revivified by (a) regeneration to remove coke deposits and (b) rejuvenation to redisperse the palladium metal component. The catalyst had been initially prepared by exchanging a sodium zeolite Y having a $SiO_2/Al_2O_3$ molar ratio of 4.8 with ammonium cations to a degree of about 85 equivalent-per cent. Thereafter the zeolite was back-exchanged with 40 equivalent-% magnesium cations and then loaded with 0.5 wt.-% palladium by the ion-exchange technique using $Pd(NH_3)_4Cl_2$. The zeolite was tableted with 20 wt.-% alumina and fired at about 520° C. for ¾ hours. A one-pound lot of this coked (14 wt.-%C.) zeolite catalyst in the form of ⅛ inch × ⅛ inch tablets (containing 3.3 wt.-% MgO, 1.3 wt.-% $Na_2O$ and 0.49 wt.-% Pd) was premixed with ten pounds of 6 × 12 mesh quartz chips. This mixture was charged to a rotary kiln and fired therein under static conditions, i.e., no additional air purge was introduced. The total retention time for the charge in the kiln was about 1.5 hours, and the residence time in the hot zone was approximately 30 minutes. The temperature of the bed was 500° C. At the end of the regeneration step, the charge was expelled from the kiln and the tablets were separated from the quartz chips by screening. Analysis of a sample of the regenerated material showed a carbon residue of 1.3 weight per cent. Zeolite crystallinity was maintained, as evidenced by a surface area of 516 square meters per gram. Following a calcination at 500° C. to remove water inadvertently adsorbed during the preceding separation step, a test sample was rehydrated to achieve a residual LOI of 8.4% and tested for catalytic activity by a procedure which simulates first-stage hydrocracking conditions. In accordance with the test procedure the sample was used to catalyze the conversion of a gas oil feedstock boiling in the range of 400° to 850° F. containing about 74 volume-% saturated hydrocarbons and about 26 volume-% aromatic hydrocarbons. The conversion temperature is that value at which the catalyst exhibits a 55% conversion to below 400° F. end-point product after 100 hours on stream. For the sample here involved a conversion temperature of 733° F. was measured. This value is comparable to that typically obtained with the same coked catalyst after regeneration by a convention oxidative fixed-bed method. Another portion of the regenerated material was given a rejuvenation treatment in aqueous $NH_4NO_3 - NH_4OH$, dried and calcined at 500° C. In the same activity test, as described above, a conversion temperature of 702° F. after about 100 catalyst age hours was measured. This is to be compared with an activity value of 707° F. measured on a batch of the same coked catalyst regenerated under fixed-bed conditions and thereafter rejuvenated by the same procedure as was used for the kiln-regenerated lot.

In a test procedure which simulates second-stage hydrocracking activity, satisfactory activity was exhibited by a sample of coked (14 wt.-% C) catalyst that had been chemically rejuvenated by ammonium ion treatment and thereafter regenerated in a rotary kiln at 550° C. for one hour using a refractory material:-catalyst ratio of 10:1. The refractory material was 200-mesh (U.S. Sieve Series) silica particles. Residual carbon was 0.9 wt.-%.

What is claimed is:

1. Process for regenerating a mass of coked zeolite molecular sieve-containing particles which comprises providing a homogeneous mixture of particles of zeolitic molecular sieve composition containing greater than 2 weight per cent based on the weight of the molecular sieve particle of a hydrocarbonaceous coke formed thereon, with from 2 to 10 times the weight thereof of particles of an inert refractory material essentially free of coke formation the particles of said mixture having a minimum particle size of 200 mesh and having a maximum dimension along any axis of 13 millimeters, and heating said mixture to a temperature of from 500° C. to 725° C. in air and the reaction products of air and the hydrocarbonaceous coke on said molecular sieve particles in a rotary kiln for a period of time to reduce the coke deposit to less than 2 weight per cent.

2. Process according to claim 1 wherein the coked zeolitic molecular sieve-containing particles being treated contain initially at least 8 weight per cent coke, and the particles of refractory material are size separable from the molecular sieve-containing particles.

3. Process according to claim 2 wherein the refractory material is quartz.

4. Process according to claim 3 wherein the refractory material is quartz and is present in an amount of from 5 to 10 times the weight of the molecular sieve-containing particles.

* * * * *